Figure 1:
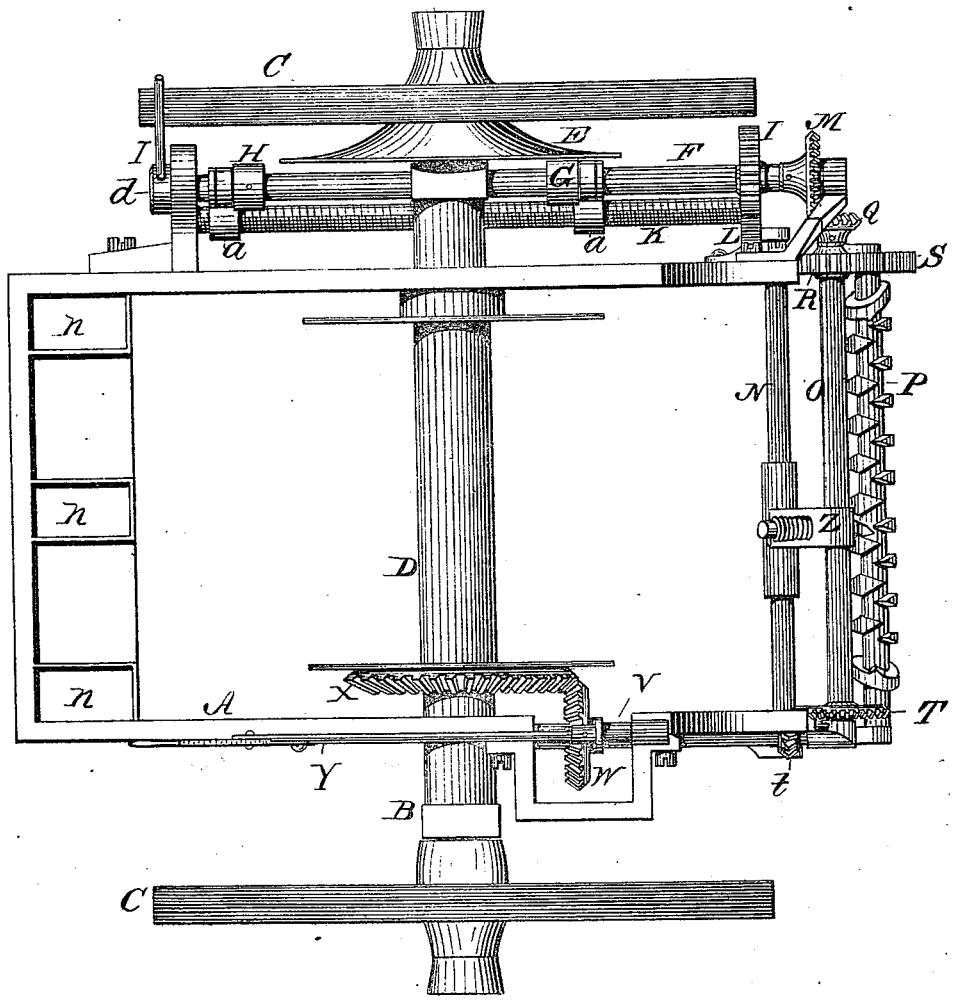

2 Sheets--Sheet 1.

T. McCABE.
Hose-Carriage.

No. 161,425. Patented March 30, 1875.

Witnesses:
Will. W. Dodge
Alex L. Hayes

Inventor:
Thomas McCabe
By his attys
Dodge & Son

2 Sheets--Sheet 2
T. McCABE.
Hose-Carriage.
No. 161,425.　　Fig. 2.　　Patented March 30, 1875.
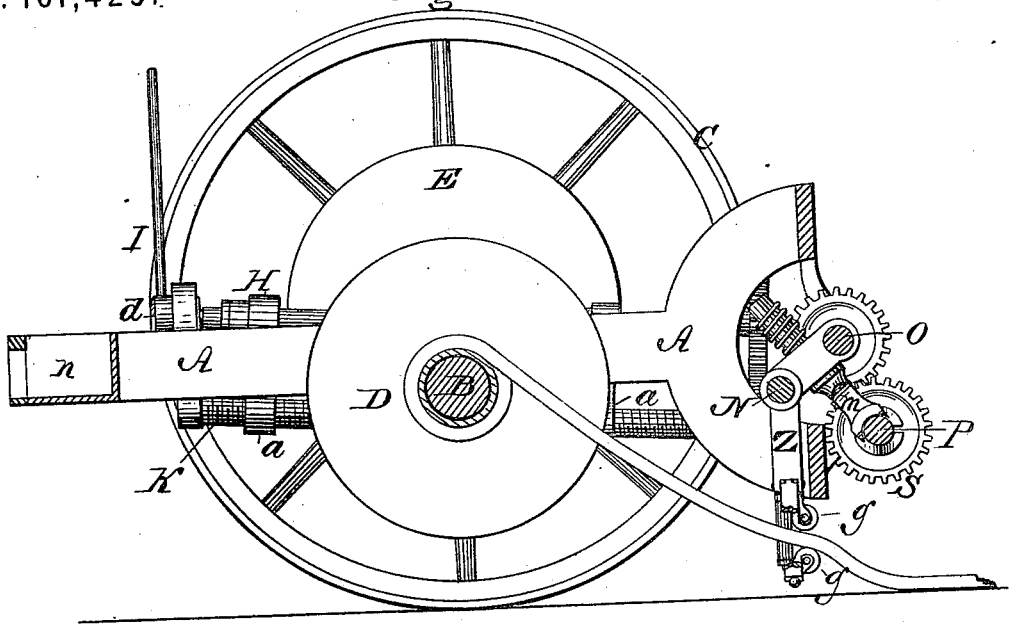
Fig. 3.
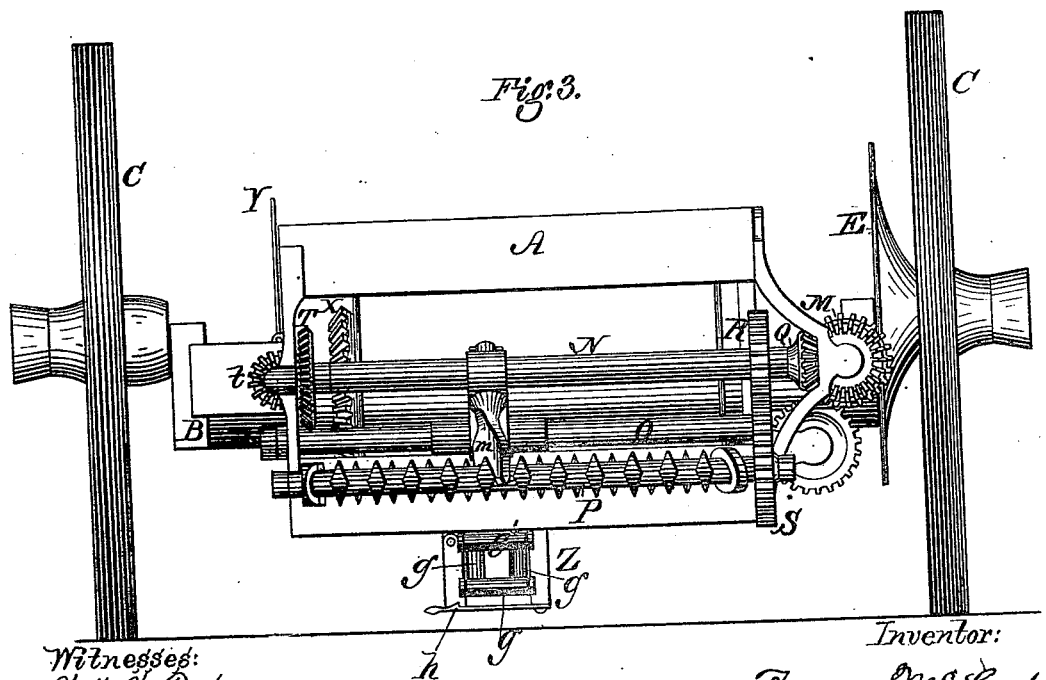
Witnesses:
Will. H. Dodge
Alex. L. Hays
Inventor:
Thomas McCabe
By his attys.
Dodge & Son

UNITED STATES PATENT OFFICE.

THOMAS McCABE, OF OTTAWA, CANADA.

IMPROVEMENT IN HOSE-CARRIAGES.

Specification forming part of Letters Patent No. 161,425, dated March 30, 1875; application filed February 9, 1875.

*To all whom it may concern:*

Be it known that I, THOMAS McCABE, of Ottawa, in the county of Carleton, Province of Ontario, Dominion of Canada, have invented certain Improvements in Hose-Carriages, of which the following is a specification:

The object of my invention is to produce a machine which will reel up and pay out the hose automatically, in order to save time and labor, and to prevent the ordinary strain on the hose and its couplings.

The invention consists in a novel combination and arrangement of devices for transmitting motion from the traction-wheels of the carriage to the reel or drum; in the arrangement of devices for laying the hose on the reel evenly from side to side; in the devices for changing the speed of the reel as its size is varied by the winding on and the unwinding of the hose; and in other details, as hereinafter described.

Figure 1 represents a top plan view of my improved carriage; Fig. 2, a longitudinal central section of the same; Fig. 3, a rear elevation of the same.

A represents a strong rectangular frame secured upon an axle, B, the ends of which are cranked or bent upward outside of the frame to receive the two traction-wheels C, as shown in Figs. 1 and 3. On the axle B, within the frame, is mounted the reel or drum D, which turns loosely thereon. To the right-hand wheel C there is secured a large friction-wheel or disk, E, and on the side of the main frame there is mounted a longitudinal shaft, F, provided with a spline, and carrying two friction-pulleys, G and H, which are free to slide endwise on the shaft, so that either one may be brought in contact with the wheel or disk E at will. When the pulley G is in gear the shaft F is turned in the proper direction to wind the hose on the reel; but when the pulley H is in gear the shaft is turned in the opposite direction, and the hose delivered from the reel, the reel being connected with and driven by the shaft F, as hereinafter explained.

Across the rear end of the frame there is mounted a shaft, O, having on one end a bevel-pinion, Q, gearing into a corresponding pinion, M, on the rear end of the shaft F. On the opposite side of the machine there is mounted a longitudinal shaft, V, provided on its rear end with a bevel-pinion, U, gearing into a pinion, T, on the transverse shaft O, as shown in Figs. 1 and 3. At its forward end the shaft V carries a bevel-pinion, W, which gears into a bevel-wheel, X, secured to the end of the reel or drum D. As the machine is drawn forward motion is communicated from the traction-wheel, through the friction-wheel and pulley, to the shaft F, and thence, through the shafts O and V and the connecting-gear, to the reel or drum D, which is turned in such manner as to wind up or unwind the hose, according to which of the pulleys is used. As the size of the reel is varied by the winding up and the unwinding of the hose, so that the amount taken up or delivered at each rotation is constantly changing, it is necessary to vary the speed of the reel to correspond. This is accomplished by simply moving the pulley G or H, whichever may be in use, lengthwise of the shaft F, to and from the center of the wheel or disk E. This movement of the pulleys is caused by a screw-shaft, K, which is arranged parallel with the shaft F, and provided with two nuts, $a$, having arms which encircle hubs or necks on the sides of the pulleys, as shown in Fig. 1. The nuts are made in two parts, hinged together, or otherwise suitably constructed, so that they can be readily released from the screw-shaft, in order to permit the pulleys to be alternately brought into and thrown out of contact with the wheel or disk, to reverse the motion of the reel and cause it to wind up or unwind the hose, as required. The screw-shaft is provided on one end with a wheel, L, which is driven by a pinion, I, secured to shaft F, so that the two shafts revolve always in opposite directions, the arrangement being such that when the reel is taking up the hose the driving-pulley G is moved from the center toward the circumference of wheel E, and that when the reel is paying out the hose the driving-pulley H is moved from the circumference to the center of the wheel. One end of the shaft F is mounted eccentrically in a rotating block, $d$, having a hand-lever, $e$, by means of which the block may be turned and the end of the shaft moved in such manner as to force the friction-pulley against or release it from the wheel or disk E, and thereby stop or start the reel.

In order that the hose may be laid on the reel regularly and evenly from end to end, and in successive layers one over another, I pass it through a guide-frame or carrier, Z, which is arranged on the rear end of the machine, and moved back and forth from side to side. This guide-frame is mounted at its upper end on the transverse shafts N and O, and at its lower end it is provided with four rollers, $g$, to surround and guide the hose. One side of the frame, with its roller, is arranged to swing outward on a hinge, in order to permit the introduction and removal of the hose. As shown in Fig. 3, the hinged side of the frame is held shut by a spring-catch, $h$. The movement of the frame or guide is caused by means of a fork, $m$, pivoted to the frame, and engaging with a transverse screw-shaft, P, which is mounted on the rear end of the machine, and provided with both a right and a left hand thread, as shown in Figs. 1 and 3. As the screw-shaft rotates the fork traverses one thread to the right, and then the other to the left, and so on, repeatedly, carrying the guide-frame or carrier Z back and forth from side to side of the machine. When the hose is being unwound the guide is not used. As shown in Figs. 1, 2, and 3, the screw-shaft P is provided with a pinion, S, which is driven by a pinion, R, on the shaft N. At its forward end the main frame A is provided with three sockets, $n$, one in the middle and one on each side, the former to receive a draft-pole and the latter to receive thills, so that the machine may be readily adapted for one or two horses. The wheel W is arranged to slide on the shaft V, but held from turning thereon by a spline, and it is connected by a clutch and rod with a hand-lever, Y, by means of which the wheel may be thrown into and out of gear. A driver's seat will be mounted on the frame in such position that the machine will balance, and that he can readily reach the two hand-levers.

It is obvious that the details of construction may be varied in many respects. The machine may have four instead of two wheels, with the reel hung between the axles. The automatic winding mechanism may be used without the traveling guide or carrier, and the latter also used on machines operated by hand. The gearing may be so arranged as to transmit motion directly to the reel on the same side of the machine which carries the wheel or plate, instead of extending around, as shown, to the other side of the machine.

Instead of using the double-threaded screw to operate the guide or carrier, it may be moved by means of a common screw arranged to reverse at the proper times, or by means of an endless chain, or a rack and pinion.

Having thus described my invention, what I claim is—

1. A hose-carriage having its reel or drum D operated from one of the traction-wheels through the medium of a friction-wheel, E, and a friction-pulley, G, the latter bearing on the face of wheel E to move to and from the center of the same, in order to vary the speed of the reel, all combined substantially as shown and described.

2. In combination with the frame A, wheels C, and drum or reel D, having the wheel X, the friction-wheel G, and the shafts F, O, and V, provided with pinions, whereby motion is communicated from the traction-wheel to the reel, as set forth.

3. In combination with the shaft F and the drum or reel D, connected therewith by suitable gearing, the friction-wheel E, sliding pulley G, and screw-shaft K, to move the pulley, as described.

4. In combination with the frame A and the drum or reel D, the sliding guide-frame or carrier Z, with the double-threaded screw P and fork $m$, for moving it to and fro, as described.

5. The guide-frame or carrier Z, provided with the rollers $g$, and having one side hinged to swing outward, all combined as shown and described.

6. In combination with the wheel E, the shaft F, provided with one or more friction-pulleys, and having one end mounted eccentrically in the block $d$, having the hand-lever $e$, as set forth.

7. In combination with the wheel E and the shaft F, provided with the sliding pulleys G and H, the screw-shaft K, provided with the detachable nuts $a$ engaging with the pulleys, as shown and described.

THOMAS McCABE.

Witnesses:
T. G. COURSOLLES,
ELIE QUÉRY.